United States Patent
Ohletz et al.

(10) Patent No.: US 10,451,140 B2
(45) Date of Patent: Oct. 22, 2019

(54) DAMPING SUPPORT DEVICE

(71) Applicants: AUDI AG, Ingolstadt (DE); Vibracoustic GmbH, Darmstadt (DE)

(72) Inventors: Armin Ohletz, Kösching (DE); Thomas Schemer, Weinheim (DE); Jan Philipp, Einhausen (DE); Christian Meyer, Gammelsdorf (DE)

(73) Assignees: AUDI AG, Ingolstadt (DE); Vibracoustic GmbH, Darmstadt (DE)

( * ) Notice: Subject to any disclaimer, the term of this patent is extended or adjusted under 35 U.S.C. 154(b) by 0 days.

(21) Appl. No.: 15/749,593

(22) PCT Filed: Jul. 20, 2016

(86) PCT No.: PCT/EP2016/067326
§ 371 (c)(1),
(2) Date: Feb. 1, 2018

(87) PCT Pub. No.: WO2017/029058
PCT Pub. Date: Feb. 23, 2017

(65) Prior Publication Data
US 2018/0223945 A1    Aug. 9, 2018

(30) Foreign Application Priority Data
Aug. 14, 2015  (DE) .................. 10 2015 215 563

(51) Int. Cl.
*F16F 13/10* (2006.01)
*F16F 9/34* (2006.01)
*F16F 9/342* (2006.01)

(52) U.S. Cl.
CPC ............ *F16F 13/107* (2013.01); *F16F 9/341* (2013.01); *F16F 9/342* (2013.01)

(58) Field of Classification Search
CPC .......... F16F 10/107; F16F 9/341; F16F 9/342; F16F 13/107; F16F 13/10
See application file for complete search history.

(56) References Cited

U.S. PATENT DOCUMENTS

| 4,657,232 | A | 4/1987 | West |
| 6,199,842 | B1 * | 3/2001 | Gennesseaux ........ F16F 13/264 |
| | | | 267/140.13 |

(Continued)

FOREIGN PATENT DOCUMENTS

| CN | 1510326 A | 7/2004 |
| CN | 102705428 A | 10/2012 |

(Continued)

OTHER PUBLICATIONS

Examination Report dated Mar. 18, 2016 of corresponding German application No. 10 2015 215 563.3; 12 pgs.

(Continued)

*Primary Examiner* — Xuan Lan Nguyen
(74) *Attorney, Agent, or Firm* — Maier & Maier, PLLC

(57) ABSTRACT

A mounting device, in particular to the mounting of an internal combustion engine on a chassis of a motor vehicle, which is provided with a fluid working chamber that is fluidically connected via at least one fluid channel to a fluid equalization chamber via at least one fluid channel in a housing. At the same time, a fluid damping chamber is provided, which is separated by an elastic membrane from the fluid working chamber and which is connected with fluidic connection via a throttling channel to an outer environment of the mounting device. The throttling channel is formed by a replaceable throttling element separately from the housing.

7 Claims, 2 Drawing Sheets

(56) References Cited

U.S. PATENT DOCUMENTS

| | | | | |
|---|---|---|---|---|
| 6,708,963 | B2* | 3/2004 | Nishi .................... | F16F 13/268 267/140.14 |
| 2002/0149144 | A1 | 10/2002 | Takashima | |
| 2004/0182631 | A1 | 9/2004 | Miyamoto et al. | |
| 2012/0242021 | A1 | 9/2012 | Koyama et al. | |

FOREIGN PATENT DOCUMENTS

| | | |
|---|---|---|
| CN | 204061703 U | 12/2014 |
| DE | 10 2004 059 406 A1 | 9/2005 |
| DE | 600 15 630 T2 | 11/2005 |
| EP | 2 103 837 A1 | 9/2009 |
| EP | 2103837 A1 | 9/2009 |
| JP | 2007-198541 A | 8/2007 |

OTHER PUBLICATIONS

Written Opinion dated Oct. 21, 2016 of corresponding International application No. PCT/EP2016/067326; 10 pgs.

International Search Report dated Oct. 21, 2016 of corresponding International application No. PCT/EP2016/067326; 10 pgs.

Notification of Transmittal of Translation of the International Preliminary Report on Patentability dated Mar. 1, 2018, in connection with corresponding international Application No. PCT/EP2016/067326 (6 pgs.).

Office Action dated Mar. 4, 2019 in corresponding Chinese Application No. 201680047615.7; 13 pages.

Office Action dated Jul. 1, 2019, in corresponding German Application No. 10 2015 215 563.3—including partial machine-generated English language translation; 7 pages.

* cited by examiner

DAMPING SUPPORT DEVICE

FIELD

The invention relates to a mounting device, in particular for damping of the mounting of an assembly on a motor vehicle body, provided with a fluid working chamber which is in fluidic communication via at least one fluid channel with a fluid equalization chamber arranged in a housing of the mounting device, wherein a fluid damping chamber is separated by means of an elastic membrane from the fluid working chamber and is in fluidic communication via a throttling channel with an external environment of the mounting device.

BACKGROUND

The mounting device is used for damping of the mounting of the assembly, for example an internal combustion engine, on another device, preferably on the chassis of a motor vehicle. The mounting device can thus be in this respect also referred to as a damping device. If the mounting device is provided for mounting the internal combustion engine on the car body of a vehicle, the designation motor bearing can be also used. In the following, only the use of a mounting device as a motor bearing will be discussed, which is to say the use of such a device for mounting an internal combustion engine on the body of a motor vehicle. However, the mounting device can be of course used also for other purposes, wherein the explanations will be applied in an analogous manner as described below.

The internal combustion engine is attached to the body of a motor vehicle via the mounting device, in particular so that it is supported by the mounting device on the body of the motor vehicle. The mounting device is therefore arranged between the internal combustion engine and the body of the motor vehicle in such a way that it is pushed by the influence of gravity that is acting on the internal combustion engine in the direction of the vehicle body.

It is preferred when not only a single mounting device is used for the mounting of the internal combustion engine, but instead a plurality of mounting devices are provided which are identical, or when at least devices are provided that are analogous to the described mounting device.

The mounting device is provided with the fluid working chamber as well as with the fluid equalization chamber. They are mutually connected to each other with a fluidic connected via a fluid channel. It is preferred when the fluid working chamber is in operative communication with the internal combustion engine and the motor vehicle body. This means that the internal combustion engine is supported on the fluid working chamber, or that it is supported via the fluid working chamber present on the motor vehicle body. With a displacement of the internal combustion engine, the volume of the fluid working chamber is therefore changed in this respect for example as a result of vibrations.

The fluid that is present in the fluid working chamber is forced with a reduction of the volume from the fluid working chamber via the fluid channel into the fluid equalization chamber. On the other hand, if the volume is increased, the fluid can flow back again from the fluid equalization chamber via the fluid channel into the fluid working chamber. The mounting device is used for damping of vibrations with the mounting of the internal combustion engine, which means that the transmission of the vibrations from the internal combustion engine to the motor vehicle body should be prevented or at least suppressed in this manner. At least a throttle can be provided for this purpose in the fluid channel, so that the damping behavior of the mounting device can be adjusted by means of the throttle.

The volume of the fluid equalization chamber should be provided so that it is not in the operative connection, or so that it will be in the operative connection between the internal combustion engine and the motor vehicle chassis only to a small extent. For example, the fluid equalization chamber is for this purpose provided in the housing of the mounting device, wherein the housing is in particular rigid. This is because although the internal combustion engine is supported on the motor vehicle body by the housing, the weight of the internal combustion engine will not be causing a change in the volume of the fluid of the equalization chamber, or at least not directly, due to the rigid design.

For example, DE 10 2004 059 406 A1 discloses a vibration damping device that is filled with a fluid which is further provided with the following: an elastic body, which connects a first and a second assembly element which device a pressure receiving chamber experiencing pressure variations when vibrations are generated; an equalization chamber, which is defined by a flexible layer enabling changes of its volume; a first aperture channel, which connects the pressure receiving chamber to the equalization chamber; a middle chamber, which is deployed between the pressure receiving chamber and the equalization chamber; a second aperture chamber, which connects the pressure receiving chamber and the middle chamber and which is tuned to a higher frequency than the first aperture chamber; a pressure fluctuation transmission mechanism, which is arranged between the pressure receiving chamber and the middle chamber for the purposes of a limited pressure transmission between the chambers by means of a limited displacement of a movable element; and a pressure control rubber plate, which defines the middle plate and controls the pressure fluctuations in the middle chamber with its elastic deformation.

Furthermore, the document 600 15 630 T2 describes a hydraulic vibration isolator which is installed between a vibrating body and a fastening part. Another vibration damper is known from the document JP 2007-198541 A.

SUMMARY

The object of the present invention is to propose a mounting device which has advantages over known mounting devices, in particular as it enables a reliable damping of vibrations of the internal combustion engine, while low construction costs are enabled at the same time.

This is achieved according to the invention with a mounting device that has the features disclosed. In this case it is provided that the throttling channel is formed by a throttle element which is formed separately from the housing and which is arranged in a removable manner in a retaining element on the housing. In principle, a fluid damping chamber is provided which is separated from the fluid working chamber by means of an elastic membrane and which is fluidically connected via a throttling channel to the external environment of the mounting device, wherein the throttle is formed with the exchangeable throttle element separately from the housing.

In addition to the fluid working chamber and to the fluid equalization chamber, the mounting device is also provided with a fluid damping chamber. Preferably, the fluid damping chamber is completely or at least almost completely fluidically separated from fluid chamber and/or from the fluid equalization chamber. This means that the fluid cannot pass from the fluid working chamber and/or from the fluid equalization chamber into the fluid damping chamber and vice versa. The elastic membrane is arranged for this purpose between the fluid working chamber and the fluid damping chamber, which is fluid-tight or at least almost fluid-tight.

If low-frequency vibrations of the internal combustion engine occur, in particular with a large stroke or with a high vibration energy, the fluid can flow from the fluid working chamber through the fluid channel in the direction of the of equalization chamber or vice versa. Such low-frequency vibrations are thus reliably damped with the aid of the fluidic connection between the fluid working chamber and the fluid equalization chamber. Since the membrane is strongly deflected in the direction of the fluid damping chamber, a higher pressure can occur in the fluid damping chamber, which can in turn lead to a buildup of undesirable noise.

For this reason, a throttling channel is provided, by means of which pressure equalization can take place in fluid that is located in the fluid damping chamber and in the external environment. The fluid damping chamber is thus fluidically connected through the throttling channel to the external environment of the mounting device. A similar embodiment has the advantage that efficient damping can be carried out also with high-frequency vibrations of the internal combustion engine by means of the elastic membrane and/or of the fluid that is present in the fluid damping chamber, without the occurrences of the noise mentioned above. A cross-section adjusting element can be also associated with the throttling channel, by means of which the cross-section of the flow in the throttling channel can be adjusted. The cross-section adjusting element is provided for example in the form of a discrete switching control valve, or as a continuously adjustable valve.

Different internal combustion engines are often mounted by means of identical mounting devices at the respective motor vehicle chassis. The internal combustion engines differ for instance with respect to their vibration behavior, so that a higher proportion of vibrations may occur as high-frequency vibration in the case of one internal combustion engine than in another one of the internal combustion engines. If these internal combustion engines are in such a case mounted with identically equipped mounting devices, the mounting devices cannot dampen the vibrations optimally with at least one internal combustion engine because they are either not matching one of the internal combustion engines or the other internal combustion engine, or because they represent a compromise.

In order to make it possible to match optimally the damping characteristics of the mounting device, in particular with high-frequency oscillations of internal combustion engines, by means of which they are to be mounted, the throttling channel should be built with a throttle element, which is formed separately from the housing and which is also exchangeable. For example, the throttling element is for this purpose releasably attached to the housing, in particular by means of a latching connection or the like. A modular system is thus realized with the aid of the mounting device described above, which is provided with a plurality of identical housings, so that the fluid chambers, the fluid equalization chamber and the fluid damping chambers are identical.

Furthermore, the modular system comprises a plurality of differently designed throttling elements which are in each case provided with a throttling channel. The throttling channels of the throttling elements may differ from each other for example in their total longitudinal extent and/or their course. While the throttling channel preferably has a straight course over its entire longitudinal extent, a curved course can be of course also provided as an alternative in order to achieve the desired damping effect of the respective mounting device.

During the assembly of the motor vehicle chassis, or during the mounting of the internal combustion engine on the vehicle body by means of the mounting device, one of the identical housings is used for the mounting the respective engine, so that a suitable throttling element is selected from a plurality of different throttling elements. The throttling element is subsequently arranged in such a way that a fluidic connection is established between the fluid damping chamber and the outer environment.

In another embodiment of the invention it is provided that fluid working chamber and the fluid equalization chambers are separated by a separating element, wherein at least one fluid equalization chamber is present in the separating element, by means of which the fluid working chamber and the fluid equalization chamber are in a fluidic connection. The separating element is arranged between the fluid working chamber and the fluid equalization chamber. In order to produce the fluidic connection between the fluid working chamber and the fluid equalization chamber, at least one fluid channel is built in the separating element. It goes without saying that an alternative can be also provided, so that the fluid channel is formed by the separating element, or so that the separating element is formed at least partially by fluid channel. The separating element is preferably arranged in the housing or it is at least arranged thereupon. For example, the separating element is attached to the housing.

The fluid channel can be at least partially designed with a nozzle shape, or it can be provided entirely in the form of a nozzle. For example, the fluid channel is formed as a round channel along its entire longitudinal extent. In addition or as an alternative, it can have a straight shape or an at least partially curved shape over the entire longitudinal extent. For example, the fluid channel is provided with a widened shape at its end that is opening into the fluid chamber and/or is opening at its end into the fluid equalization chamber, so that the diameter of the fluid chamber is increased in the direction of the fluid working chamber and/or in the direction of the fluid equalization chamber.

According to another particularly preferred embodiment of the invention, it is provided that the fluid damping chamber is arranged in the separating element and the membrane is fastened to the separating element. A space-efficient device of the mounting device is therefore achieved in this manner. For example, the separating element is provided with a recess for the fluid damping chamber which is opened in the direction of the fluid working chamber. The membrane thus completely overlaps the fluid damping chamber or the recess, so that the fluid damping chamber is fluidically separated from the fluid working chamber. For example, the membrane in this case preferably engages the separating element so that it is held on it form-fittingly and force-fittingly.

It is particularly preferred when the separating element is designed with several parts and when it is provided with at least a first part as well as with a second part. In the first part, which is preferably arranged on the housing or fastened to it, is arranged at least one fluid channel. The second part of the separating element is attached to the first part and it overlaps it, preferably on all of the sides of the fluid working chamber. In this case it can be arranged for example in such a way that the membrane is fixed to the first part or pushed in the direction of the first part. For example, both the first part and the second part are provided with a recess in which is engaged the membrane or in which an edge projection of the membrane is engaged.

According to a further development of the invention it is provided that the housing is equipped with a flow channel which is fluidically connected to the fluid damping chamber and which is engaged in the throttling element. The fluidic connection between the fluid damping chamber and the outer connection in this case runs at least partially through the flow channel of the housing. For example, the flow channel is arranged centrally with respect to a longitudinal axis of the mounting device and/or it runs exactly in the axial direction with respect to its central longitudinal axis. For example, the flow channel is on one side fluidically connected to the fluid damping chamber, while it is engaged on the other side by the throttling element in the flow channel. For example, the throttling element is engaged only partially in the flow channel. However, it can be also provided that the throttling element completely penetrates the flow channel over its longitudinal extent.

According to a particularly preferred embodiment of the invention it is provided that the flow channel opens directly into the fluid damping chamber, wherein the housing passes through the separating element, in particular through a first part of the separating element. The flow channel thus protrudes for example up to the fluid damping chamber or into it. It passes through the separating element, so that the fluid damping chamber is at least partially enclosed by it. This makes it possible to create a space-saving and stable design of the mounting device.

In another embodiment of the invention it is provided that the throttling element is arranged in a retaining element which is fixed in a releasable manner to the housing, in particular by latching, wherein a supporting element of the retaining element receiving the throttling element is interposed in the flow channel.

The throttling element is at least partially arranged in the retaining element. For example, it passes through a retaining element, or through a wall of the retaining element. The throttling element is arranged for example in the supporting element of the retaining element. The retaining element serves in particular for fastening of the throttling element to the housing of the mounting device. For this purpose, the retaining element is releasably fastened to the housing. It is particularly preferred when a latching attachment is used, which enables both a quick assembly as well as a simple disassembly. By engaging the supporting element in the flow channel, reliable centering of the throttling element with respect to the housing can be also realized.

According to another embodiment of the invention it is provided that the flow channel is equipped at least partially with a conical inner peripheral surface. The flow channel is encompassed by the inner peripheral surface that is formed by the housing. The inner peripheral surface extends at least partially in a conical shape. It can be also provided that the flow channel is equipped with a cylindrical shape, in particular with a circular cylindrical section to which is directly connected a conical section. In particular, the cylindrical section of the flow channel is provided on the side of the fluid channel which is facing the fluid damping chamber. On the other hand, the conical region is preferably arranged on the end of the flow channel which is facing away from the fluid damping chamber. It goes without saying that the flow channel can also be provided with a conical shape over its entire extent. The centering of the supporting element and thus also of the throttling element with respect to the housing is thus further simplified with the aid of the conical inner peripheral surface.

In a further development of the invention it is provided that the throttling element is equipped with a retaining projection at its end arranged in the flow channel, wherein a seal is arranged between the retaining projection and the supporting element, in particular in a clamping manner.

As was already mentioned above, the supporting element, which receives the throttling element, protrudes at least in some regions into the flow channel. The end of the throttling element, which is projecting over the supporting element and into the flow channel, is provided with a retaining projection. The seal is provided in the axial direction with respect to the longitudinal central axis of the throttling element, or of the supporting element. The seal can be provided for example in the form of a sealing ring, in particular as an O-ring. It is particularly preferred when the seal is held so that it is clamped between the retaining projection and the supporting element, which is to say that it is on the one hand arranged on the retaining projection and on the other hand on the supporting element. A secure positioning of the seal is thus guaranteed in this manner.

In a further development of the invention it is provided that the seal is resting against the inner peripheral surface. When the seal is resting against the inner peripheral surface of the flow channel, in particular on the conical inner peripheral surface, excellent sealing of the supporting element as well as of the throttling element can be realized with respect to the housing. The fluid that is flowing from the fluid damping chamber, or the fluid that is flowing into it, can therefore not flow past the throttling element, since it can only flow along the fluid connection that is extending through the throttling channel.

Finally, it can be also provided in another embodiment of the invention that a first mounting position is arranged, in particular for the internal combustion engine, on a fluid working chamber together with the separating element delimiting a mounting cover and/or a second mounting position, which used in particular for the chassis of the motor vehicle, is connected to the housing. The damping effect of the mounting device is in this case provided between the first mounting position and/or the second mounting position, in particular for a motor vehicle car body that is connected to the housing. The damping effect of the mounting device is acting between the first and the second mounting position. The first position is preferably used for connecting the internal combustion engine, in particular directly. The first mounting position is located on the mounting cover which delimits at least partially the fluid working cover, in particular together with the separating element. For example, the mounting cover is provided for this purpose with a recess that is used for the fluid working chamber which is closed by the separating element. The second mounting position can, on the other hand, be connected to the housing, preferably in a rigid manner.

The invention of course also relates to a motor vehicle that is provided with an internal combustion engine, as well as to a motor vehicle car body and a mounting device by means of which the internal combustion engine is mounted, wherein the mounting device is provided with a fluid working chamber which is fluidically connected by means of at least one fluid channel to a fluid equalization chamber arranged in a housing of the mounting device. A fluid damping chamber is provided at the same time, which is separated by means of an elastic membrane from the fluid working chamber and is fluidically connected via the throttling channel to the outer environment of the mounting device, wherein the throttling channel is formed with an exchangeable throttling element that is separate from the housing.

The advantages of such a design of the motor vehicle or of the mounting device were already pointed out. Both the motor vehicle and the mounting device according to the invention can be further developed according to embodiments, which are hereby being referred to.

BRIEF DESCRIPTION OF THE FIGURES

The invention will be next disclosed in more detail based on the embodiment that is illustrated in the figures without imposing any limitation on the invention. The figures show the following.

DETAILED DESCRIPTION OF THE FIGURES

Figure 1:
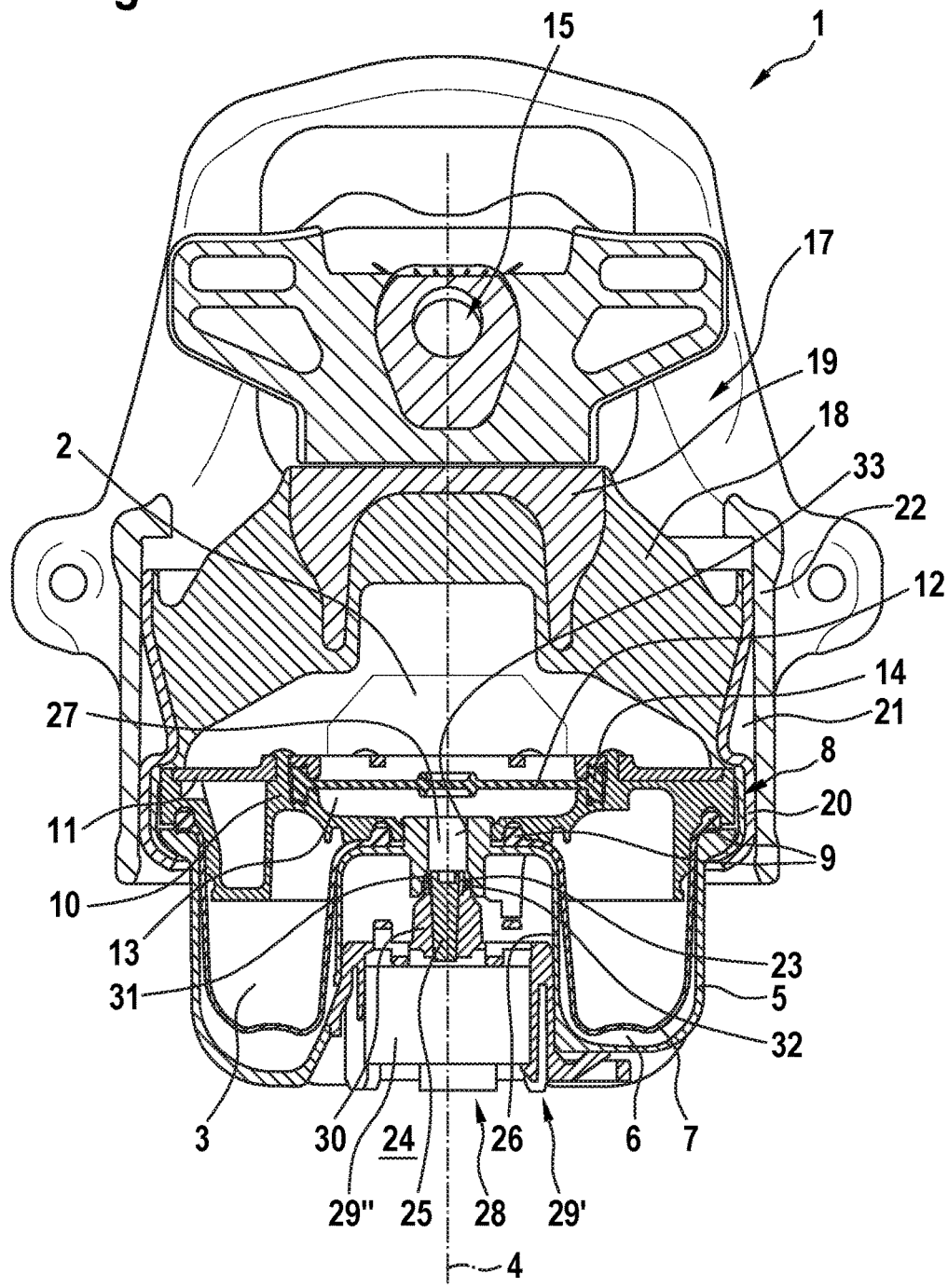
FIG. 1 shows an illustration of a longitudinal sections through a mounting device for mounting an internal combustion engine in a motor vehicle car body.

FIG. 1 shows longitudinal view illustration of a section of the mounting device 1. The device is used for example to provide a damping connection between an assembly, in particular an assembly of an internal combustion engine and other devices, for example a car body of a motor vehicle. The mounting device 1 is provided with a fluid chamber 2, as well as a fluid outlet chamber 3. A longitudinal central axis 4 of the mounting device 1, along which the longitudinal section is arranged, is also indicated. The fluid working chamber 2 and the fluid equalization chamber 3 are in fluidic connection with each other via at least one fluid channel.

The fluid equalization chamber 3 is arranged in a housing 5 of the mounting device.

For example, the housing 5 is for this purpose equipped with an annular recess 6 in which is provided the fluid equalization chamber 3. In order to form the fluid equalization chamber 3, it can be provided in a preferred embodiment that an elastic element 7, in particular an elastomer element, is arranged in the housing 5, in particular in the annular recess 6. It can be fastened in a fluid-tight manner to a separating element 8 in order to form the fluid equalization chamber 3. For example, the element 7 is provided with retaining projections 9, which are clamped between the separating element 8 and the housing 5.

The separating element 8 serves to separate the fluid working chamber 2 and the fluid equalization chamber 3. Accordingly, the separating element 8 is arranged between them. In the separating element 8 is arranged the at least one fluid channel by means of which the fluid working chamber 2 and the fluid compensation chamber 3 are in fluidic connection. The separating element 8 consists for example of a first part 10 and of a second part 11. The first part 10 is attached directly to the housing 5; in particular so that it is arranged on it. On the other hand, the second part 11 is attached to the to the first part 10, which is to say that it is not directly connected to the housing 5. The second part 11 is for example riveted to the first part 10.

An elastic membrane 12 is held between both part 10 and 11 of the separating element 8, in particular by being clamped therein. The membrane 12 serves to separate a fluid damping chamber 13 in the separating element 8, in particular in the first part 10 of the separating element 8, which is completely overlapped by the membrane 12. The fluid damping chamber 13 is therefore in this respect completely fluidically separated from the fluid working chamber 2 as well as from the fluid equalization chamber 3.

The membrane 12 is provided for example with an edge 14 which is engaged on one side in the first part 10, and on the other side also in the second part 11 of the separating element 8. The second part 11 of the separating element 8 is designed so as to be permeable to fluid, so that a direct fluidic connection is created between the fluid working chamber 2 and the membrane 12.

The mounting device 1 is provided with a first mounting position 15 as well as with a second mounting position. With the first mounting position 15, for example the internal combustion engine is attached, and with the second mounting second mounting position, the car body of the motor vehicle is attached to the mounting device 1, so that the internal combustion engine is subsequently connected to the car body of the motor vehicle. The first mounting position 15 is arranged at a mounting cover 17, which is equipped with a spring body 18, in particular an elastomer. The spring body 18 is connected for example via a mounting core 19 to the first mounting position 15. A deviation from the embodiment illustrated here is of course also possible so that the first mounting position can be arranged also directly on the mounting core 19.

The spring body 18 delimits together with the separating element 8 the fluid working chamber 2.

In particular, the spring body 18 is provided with a recess which is overlapped or closed by the separating element 8. The mounting core 19 is embedded in the spring body 18, in particular so that it is cast in it. The spring body 18 can laterally grip the separating element 8, so that it is extended up to the housing 5. For example, the spring body 18 is attached to the housing 5 and/or the separating element 8 by means of a clamping clip 20.

For example, the spring body 18 is guided via the clamping clip 20 into a guiding recess 21 with a guiding device 22 in the axial direction with respect to the longitudinal central axis 4. In particular, buckling of the spring body 18 in the radial direction can be prevented with the aid of the guiding device 22. The guiding device 22 is fastened for example to the car body of the motor vehicle. A second mounting position can be provided at the guiding device 22. In this case, the guiding device is preferably fastened to the housing 5.

In order to further improve the damping effect of the mounting device 1 or to prevent undesirable noise, the fluid damping chamber 13 is fluidically connected via a throttling channel 23 to an outer environment 24 of the mounting device 1. The throttling channel 23 is in this case formed by a replaceable throttling element 25, which is separate from the housing 5. For example, the housing 5 is provided with an annular projection 26, which is at least partially gripped by the fluid equalization chamber 3 and projecting in the direction of the fluid damping chamber 13. In the embodiment shown here, the housing 5 is provided with a flow channel 27, which is preferably formed in the projection 26.

For example, the flow channel 27 is arranged over its entire longitudinal extent directly and/or centrally with respect to the longitudinal central axis 4 of the mounting device 1 in the housing 5. The flow channel 27 is on one side fluidically connected to the fluid damping chamber 13. On the side of the flow channel 27 that is facing away from the fluid damping chamber 13, the throttling element 25 is engaged in therein. It is preferred when the flow channel 27 opens directly into the fluid damping chamber 13.

For this purpose, the housing 5 penetrates, in particular with the projection 26, the separating element 8 up to the fluid damping chamber 13.

The throttling element 25 is arranged in a retaining element 28 which is fixed by latching with a latching connector 29 (not shown here) to the housing 5. A weight 29" can be attached by means of a latching connector 29' to the retaining element 28. It is preferred when throttling element 25 penetrates through a supporting element 30 of the retaining element 28. The throttling element 25 preferably projects into the flow channel 27. Between the supporting element 30, in particular a free end of the supporting element 30, and the throttling element 25, in particular a retaining projection 31 of the throttling element 25, is arranged a seal 32, in particular by being clamped between the supporting element 30 and the throttling element 25. However, the seal 32 lies at least on the supporting element 30 as well as on an inner peripheral surface 33 of the flow channel 27. In particular, the inner circumferential surface 33 is provided with a conical design in the region in which the seal 32 is placed on it and it opens in the direction facing away from the fluid damping chamber 13. A simple centering of the throttling element 25 as well as reliable sealing can thus be realized by means of the seal 32.

Figure 2:
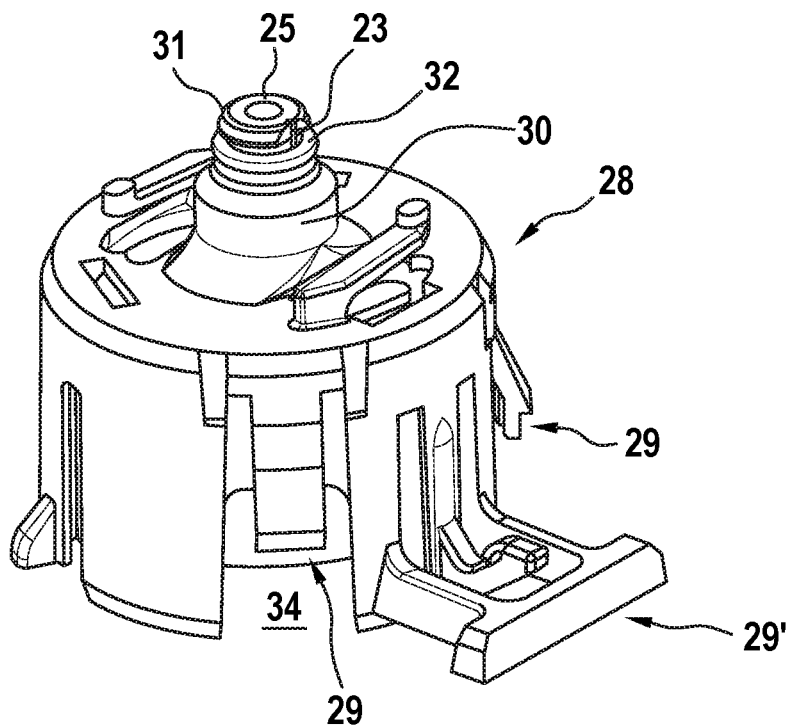
FIG. 2 shows a detailed view of a throttling element forming a throttling channel which is arranged in a retaining element.

FIG. 2 shows a detailed illustration of the throttling element 25, of the seal 32, as well as of the retaining element 28. A latching connector 29 is also clearly shown in the figure, by means of which the retaining element 28 can be fastened by latching to the housing 5. The throttling element 25 is arranged in the supporting element 30 of the retaining element 28 and it fully penetrates through it, preferably in the axial direction, so that the throttling channel 23 opens in an inner volume 34 of the retaining element 28, which is in a permanent fluidic connection to the outer environment 34.

As can be seen here, the edge of the throttling channel 23 is opened into the throttling element 25. In particular, the throttling element 25 is provided with a region that is mounted in the throttling channel 23, so that in particular the holding projection 31 is deployed only at a distance from the throttling channel 23. The throttling channel 23 is at least partially formed by the throttling element 25 on the one hand, together with the seal 32 and the supporting element 30 on the other hand.

Figure 3:
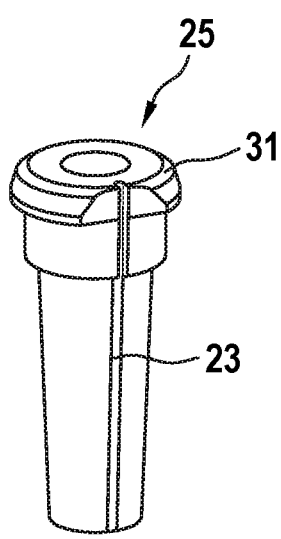
FIG. 3 shows a detailed view of the throttling element.

FIG. 3 shows a detailed view of the throttling element 25 with the throttling channel 23 formed therein. It is evident that the throttling channel 23 is provided with an open edge over the entire longitudinal extent in the throttling element 25, so that it is thus designed as a groove. As an alternative, an embodiment of the throttling channel 23 can be of course also realized in the throttling element 25. In this case, the throttling channel 23 can be designed for example in the form of a perforation or of a bore.

A particularly effect damping can be realized by means of the embodiment of the mounting device 1 described above, both for low-frequency and for high-frequency vibrations of the internal combustion machine. In addition, the mounting device can be adapted to the vibration behavior of different internal combustion engines in a simple manner. For this purpose, the throttling element 25 is arranged on the housing 5 in an exchangeable manner, wherein the retaining element 28 is provided.

The invention claimed is:

1. A mounting device for damping of the mounting of an assembly in a car body of a motor vehicle, comprising:
    a fluid working chamber which is fluidically connected by at least one fluid channel to a fluid equalization chamber provided for the mounting device in a housing, wherein a fluid damping chamber is separated by an elastic membrane from the fluid working chamber, and is fluidically connected to an outer environment of the mounting device via a throttling channel, wherein the throttling channel is formed within an exchangeable throttling element, which is separate from the housing, and which is arranged in a retaining element which is releasably secured to the housing,
    wherein the fluid working chamber and the fluid equalization chamber are separated by a separating element, wherein the at least one fluid channel is formed in the separating element by which the fluid working chamber and the fluid equalization chamber are in a fluidic connection,
    wherein the housing is provided with a flow channel, which is fluidically connected to the fluid damping chamber and in which the throttling element is at least partially arranged
    wherein the flow channel opens directly into the fluid damping chamber, wherein the housing passes through the separating element.

2. The mounting device according to claim 1, wherein the fluid damping chamber is arranged in the separating element and the membrane is fastened on the separating element.

3. The mounting device according to claim 1, wherein the retaining element is secured to the housing with latching and a supporting element of the retaining element receiving the throttling element is interposed in the flow channel.

4. The mounting device according to claim 1, wherein the flow channel is provided with an at least partially conical inner circumference surface.

5. The mounting device according to claim 4, wherein the throttling element is provided at its end which is arranged in the flow channel with a retaining projection, wherein a seal is arranged between the retaining projection and the supporting element.

6. The mounting device according to claim 5, wherein the seal is placed on the inner circumference surface of the flow channel.

7. The mounting device according to claim 1, wherein a first mounting position is arranged on a mounting cover delimiting the fluid working chamber together with the separating element and a second mounting position is connected with the housing.

* * * * *